Patented July 23, 1946

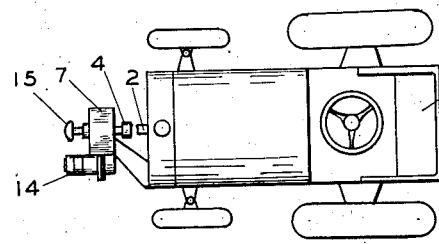
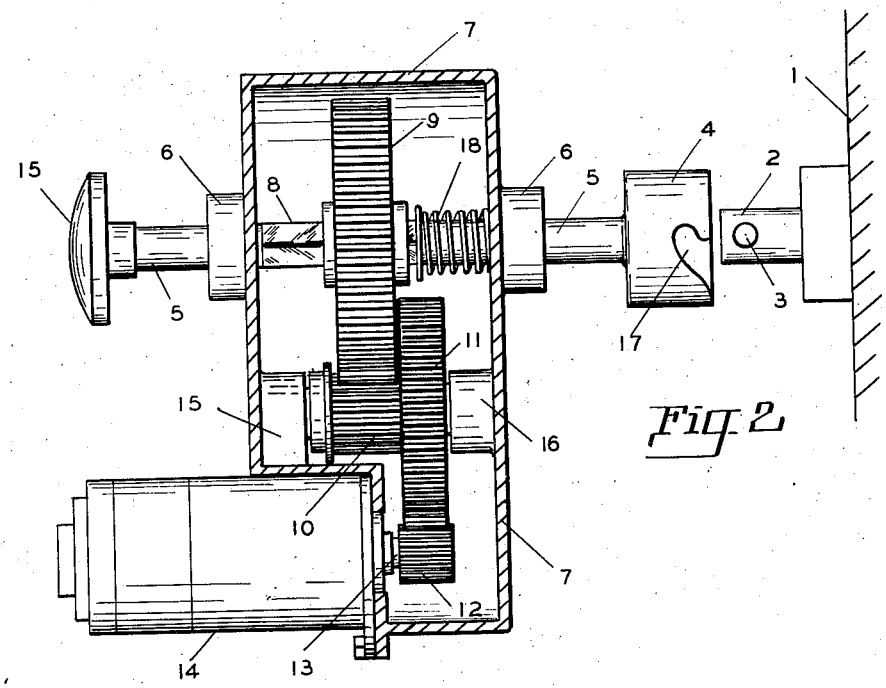
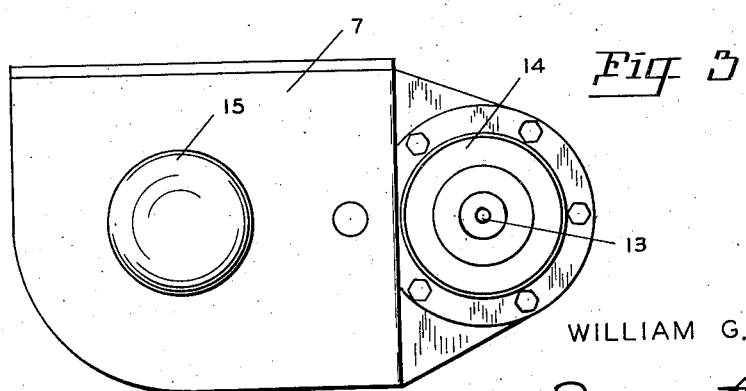

2,404,419

UNITED STATES PATENT OFFICE 2,404,419

ENGINE STARTING APPARATUS

William G. Weatherly, Colfax, Wash.

Application June 24, 1944, Serial No. 541,976

1 Claim. (Cl. 123—179)

This invention relates to improvements in engine-starting apparatus which may be either permanently installed in connection with an engine or portable for operative engagement with engines on various pieces of equipment not provided with a starter.

The invention is particularly well adapted for use in connection with heavy duty Diesel engines for tractors, combines, road machinery and the like, which must be cranked by hand if they are not provided with starting mechanisms.

One of the principal objects of the invention is to provide a starting mechanism which may be permanently attached to the engine or which may be moved about as a portable unit for operative engagement with various engines.

The foregoing and other objects will appear as my invention is more fully hereinafter described in the following specification illustrated in the accompanying drawings, and finally pointed out in the appended claim.

In the drawings:

Figure 1 is a top plan view of a piece of road machinery showing a starter made in accordance with my invention permanently attached thereto.

Figure 2 is an enlarged vertical sectional view of the invention.

Figure 3 is an enlarged front elevation of Figure 2.

Figure 4 illustrates the invention constructed as a portable unit and applied to a self-propelled vehicle for transporting the device and the operator to various engines to be dealt with.

Figure 5 is a front elevation of Figure 4.

Figures 4, 5:
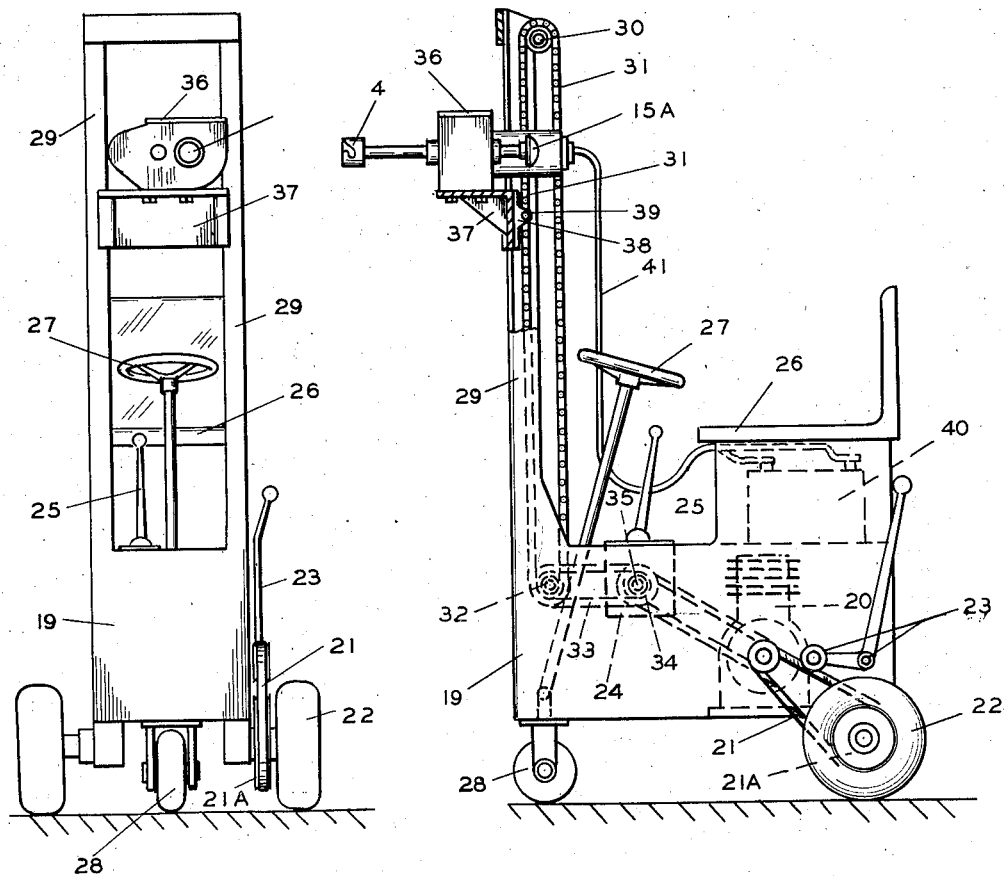

Referring now more particularly to the drawings:

In Figure 1 reference numeral 1 indicates generally a self-propelled piece of road machinery or the like powered by a Diesel engine, out of the forward end of which extends one end of a crank-shaft 2 provided with a pin 3 extending therethrough and outwardly from both sides thereof and adapted to be engaged by a self-releasing clutch 4. The clutch 4 is formed integral with or attached to a shaft 5 journaled in bearings 6 carried by a housing 7. The shaft 5 is squared for a portion of its length as at 8 within the housing and slidably carries a driven gear 9 engaged with and driven by a gear 10 formed integral with or secured to a gear 11 which is driven by a driving gear 12 secured to the shaft 13 of a starting motor 14. The gears 10 and 11 are journaled in bearings 15 and 16 formed integral with and extending inwardly from the walls of the housing 7. From the foregoing it will be apparent that when the starting motor 14 is put into operation, the gear 9 and the shaft 5, by reason of its squared portion 8 extending through the gear 9, will be rotated along with the clutch 4. The outermost end of the shaft 5 is provided with a hand-engaging means in the form of an enlarged button 15 which is pivotally attached to the end of the shaft by any suitable means so that after the starting motor has been put into operation, an operator may press inwardly on the handle 15 to cause the shaft 8 to slide through the gear 9 and to put the clutch 4 into engagement with the pin 3 of the crank shaft 2 to crank the motor being dealt with. After the motor has been started, the pin 3 of course pulls away from the notches 17 and the clutch 4 and through the medium of the spring 18 the shaft is moved forwardly and the clutch 4 is pulled away from the crank shaft.

In the other form of the invention illustrated in Figures 4 and 5, I provide a vehicle 19 powered and driven by an engine 20 through the medium of a belt 21 operatively embracing a pulley 21A attached to a traction wheel 22 and controlled by a more or less conventional idling mechanism generally indicated at 23. Selective gear transmission means 24 is disposed within the vehicle and provided with a shifting lever 25 terminating within convenient reach of the operator's seat 26 in front of which is disposed a steering wheel 27 suitably connected with the steerable front wheel 28 of the vehicle. The forward end of the vehicle is provided with a vertical frame 29 to the upper end of which is rotatably mounted a sprocket wheel 30 operatively embraced by a sprocket chain 31 which, at its opposite end embraces a sprocket 32 driven by a chain 33 operatively embracing a sprocket wheel 34 secured to, and driven by the shaft 35 of the gear transmission 24.

The starting mechanism, generally indicated at 36, is identical with that shown in Figures 2 and 3, and is slidably mounted between the vertical members of the frame 29 by means of a bracket 37 formed with flanges 38 bolted to the chain 31 as at 39. The motor of the starting mechanism receives electrical energy from a battery 40 disposed within the vehicle, through supply wires 41 and any approved form of switch (not shown).

By this arrangement I am able to raise and lower the starter with respect to the frame by merely operating the shifting lever 25. When the starter has been moved into position for engagement with an engine to be cranked, the operator merely presses forward on the button 15A and releases it after the engine has started. This portable unit enables an operator in a garage or other storage place to quickly and conveniently travel about from one engine to another to apply the starting mechanism thereto.

While I have shown a particular form of embodiment of my invention, I am aware that many minor changes therein will readily suggest themselves to others skilled in the art without departing from the spirit and scope of the invention.

Having thus described my invention, what I claim as new and desire to protect by Letters Patent is:

Engine starting apparatus comprising a housing, a train of gears rotatably mounted within the housing and driven by an electric motor carried on the exterior of the housing, a shaft slidably and yieldingly mounted through and beyond two walls of the housing and through one of the driven gears therein to be rotated thereby, a clutch formed on the outermost end of the shaft for engaging the crank-shaft of an engine, means on its opposite end for slidably advancing said shaft and clutch into said engagement, said housing being slidable in a vertically mounted frame carried by an engine driven vehicle, an endless chain extending full length of the frame and actuated by said engine, and means connecting the housing with the chain for moving the housing to various elevations with respect to the frame.

WILLIAM G. WEATHERLY.